Sept. 12, 1967      U. R. JAEGER      3,340,589
METHOD OF MAKING SHEET METAL PANEL
Filed March 10, 1964
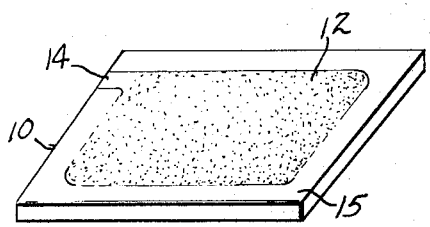
FIG-1
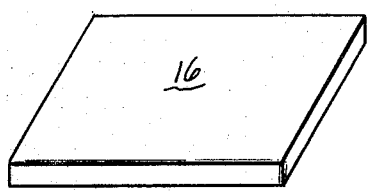
FIG-2
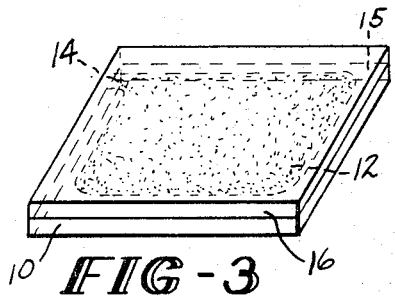
FIG-3
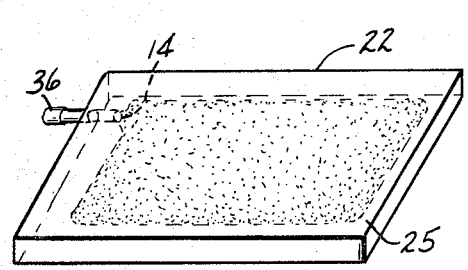
FIG-5
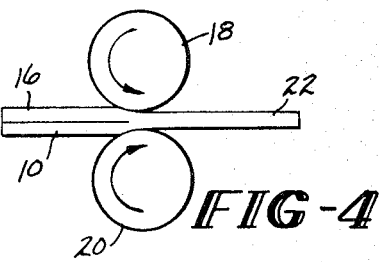
FIG-4
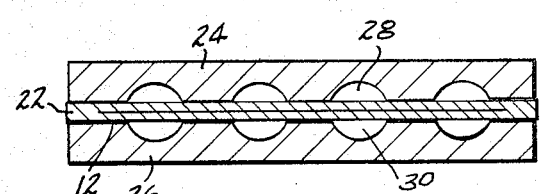
FIG-7
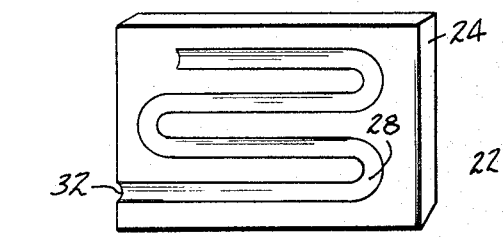
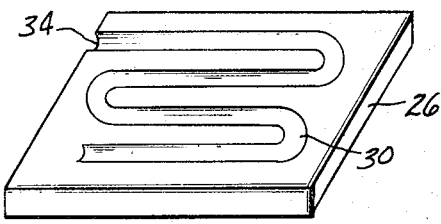
FIG-6
FIG-8
INVENTOR.
ULRIC R. JAEGER
BY Martin D. Wittstein
ATTORNEY

United States Patent Office 3,340,589
Patented Sept. 12, 1967

3,340,589
METHOD OF MAKING SHEET METAL PANEL
Ulric R. Jaeger, Greenwich, Conn., assignor to Olin Mathieson Chemical Corporation, a corporation of Virginia
Filed Mar. 10, 1964, Ser. No. 350,890
3 Claims. (Cl. 29—157.3)

This invention relates generally to sheet metal processing for forming unitary composite articles having internal tubular passageways or cavities in various configurations. More particularly, it relates to a method of fabricating such an article in which the dimensions and configuration of the internal cavities are held to extremely close tolerances for functional or decorative purposes.

In conventional fabrication of sheet metal panels having internal hollow cavities, a sheet of metal is imprinted by suitable means with a pattern of stop weld material corresponding generally to the ultimate design or configuration of hollow cavities desired in the final product. A second sheet of dimensionally equivalent metal is superposed on the first sheet with the layer of stop weld material sandwiched therebetween and the two sheets are suitably secured together as by spot welding at the four corners to prevent relative movement during subsequent processing. The blank consisting of the two sheets and layer of stop weld material is then heated to a required temperature and subjected to a pressure welding operation, such as by roll forging, thereby integrally uniting the individual sheets together over those areas not coated with the stop weld material. During the rolling operation, the individual sheets are reduced in thickness and elongated in the longitudinal direction of rolling; accordingly, the pattern of stop weld material is initially applied in a foreshortened correspondence to the final elongated pattern in direct proportion to the amount by which the sheets are elongated during pressure rolling.

Following the pressure rolling operation, the unified panel is generally cold rolled to a final gage and may be annealed to achieve desired physical properties. The panel is then subjected to an inflation operation by providing a suitable opening between the two sheets in an area where the stop weld pattern is extended from its internal portions to the outer edge of the unified panel. A nozzle is inserted into this opening for injection into the unjoined areas of the unified panel with a suitable fluid under pressure. Injection of the pressure fluid continues until all unjoined portions of the panel have been expanded to the desired height. In accordance with conventional practice, the panel inflation may be carried out freely, i.e., without external restraint, or the panel may be first inserted between a pair of shaped dies or platens each having cavities formed in a face thereof which corresponds to the elongated pattern of step weld material and to the desired pattern of internal cavities or passageways.

A major disadvantage of the prior art is the achievement of an expanded panel having between portions of the thickness thereof a system of internal hollow passageways or cavities which conform to a desired configuration with extreme exactness or which achieve desired close tolerances. Among the reasons for this failure of the prior art is firstly the fact that considerable difficulty is sometimes experienced in accurately imprinting a foreshortened pattern of stop weld material which will achieve the desired final configuration after elongation during pressure rolling, due to the many variables which must be considered when contemplating the pattern. Secondly, it is not always possible to accurately predict the extent to which the individual sheets will bond or not bond in those areas immediately adjacent the periphery of the stop weld pattern, and this frequently leads to minor variations in the ultimate cavity pattern. Still further is the fact that minor variations in the thickness or the physical properties of the individual sheets may result in corresponding variations in the tube or cavity height in the final product as a result of differential expansion when the unified panel is subjected to the inflation pressure, particularly if the panel is expanded freely. On the other hand, if shaped dies are employed to confine the expanded cavities to the desired configuration, a major difficulty is encountered in correlating the imprinting of the initial stop weld pattern and the contemplated elongation thereof with the preformed dies in order to achieve a correspondence between the elongated stop weld pattern and the die pattern so that the panel will expand in the unjoined areas thereof into the corresponding cavities provided in the die faces.

These and other disadvantages of the prior art practice have been overcome to a surprising extent by the present invention which contemplates a method of fabricating an expanded passageway or hollow cavity panel in which the hollow portions of the panel are held to extremely close tolerances. It is frequently desirable to provide hollow passageway panels, for example for heat exchange purposes or as accumulators in heat exchange systems, in which the hollow portion of the panels achieve an exact predetermined volume for containment of a low pressure heat transfer medium. Another advantageous application of the process of this invention is the fabrication of articles or panels having internal passageways adapted to contain an electric cable, wire, or heating element, where internal pressures are not present. Finally, the articles achieved by the present invention also find considerable utility in the field of architectural or decorative construction panels wherein it is aesthetically desirable to have a pattern of raised or embossed surface configurations which conform precisely to a predetermined design.

The present invention contemplates generally the provision, on a sheet of metal, of a stop weld material in which the entire sheet is covered with this material with the exception of a peripheral or marginal edge portion, and except for a small segment of this portion where the stop weld material is extended to an edge of the sheet. After superposing a dimensionally similar sheet of metal over the stop weld material, the sheets are temporarily secured together and pressure rolled in known manner to firmly weld the two sheets together over the peripheral portion not coated with the stop weld material. The unified blank is then placed between a pair of confining dies having formed on one or both opposing faces thereof cavities which correspond in configuration and depth to the ultimate desired configuration and height of the passageway or cavity pattern of the finished panel. A nozzle is inserted into an opening formed between the unified sheets in the aforementioned segment where the stop weld material is extended to the edge of the sheets, and a high pressure fluid is injected into the unjoined internal portion of the panel with sufficient pressure to expand the individual sheets into the depressions formed in the die faces. The distensions raised from the individual sheets over the unjoined portions thereof thus correspond exactly to the cavity pattern of the dies.

Having thus described in general terms one embodiment of the present invention, it is a principal object thereof to provide a method of fabricating a sheet metal panel having hollow internal portions or cavities of a particular design.

It is another object of the present invention to provide a method of fabricating a sheet metal article having internal hollow portions or cavities in which the ultimate configuration thereof corresponds with extreme accuracy to the desired configuration thereof.

It is another object of the present invention to provide a method of fabricating a sheet metal panel having internal hollow portions or cavities of a particular design which eliminates the difficulties attendant with predisposing a foreshortened pattern of stop weld material which corresponds to the final desired pattern.

It is still another object of the present invention to provide a method of fabricating a sheet metal article having internal hollow passageways or cavities in which the cavity pattern is determined solely by a cavity configuration formed in one or both opposing faces of constraining dies and which will accurately conform to the pattern thereof.

These and other objects of the present invention will become apparent from a consideration of the following detailed description of the invention when read in conjunction with the accompanying drawings in which:

FIGURE 1 is a perspective view illustrating a sheet of metal with a pattern of stop weld material applied thereto;

FIGURE 2 is a similar view of the sheet of metal to be superposed on the sheet of FIGURE 1;

FIGURE 3 is a perspective view of the blank formed from the sheets of FIGURES 1 and 2;

FIGURE 4 is a side view illustrating the unification of the blank illustrated in FIGURE 3;

FIGURE 5 is a perspective view of the unified panel with an inflation nozzle inserted therein;

FIGURE 6 is a perspective view of one form of hold down die employed during inflation of the unified panel;

FIGURE 7 is a side sectional view showing the unified panel in place between the hold down dies just prior to inflation; and FIGURE 8 is a view similar to FIGURE 7 immediately after inflation.

Referring now to the drawings, FIGURE 1 illustrates a sheet of metal 10 consisting of an alloy of copper, aluminum, magnesium, steel, or other metal alloys which are adaptable to pressure welding by high pressure hot rolling techniques. The confronting faces of sheet 10 and a corresponding sheet 16 illustrated in FIGURE 2 are cleaned by conventional steps such as wire brushing, organic solvent degreasing, etching in acid solutions or similar steps, after which a pattern 12 of stop weld material is applied to the confronting face of at least one of the sheets 10 or 16.

The separation material may be sprayed through a masking die, painted through a stencil, squeezed through a silk screen or applied in any other suitable manner. The separation material 12 is applied to a major portion of the surface of the sheet in a pattern corresponding substantially to the peripheral configuration of the sheet; only a marginal edge portion 15 is left devoid of stop weld material, except for a small portion 14 where the stop weld material is extended to an edge of the sheet for a purpose to be hereinafter made clear.

Any suitable separation material may be employed, its chief function being to prevent welding of the two sheets of metal together during subsequent pressure rolling, or at least to permit only a partial or low quality bond as compared to the integral weld achieved by pressure rolling of the two sheets in those areas not coated with the stop weld material. Among the materials suitable for this purpose are a graphite water glass mixture which is highly preferable, other inorganic mixtures such as zinc oxide, kieselguhr or other diatomaceous earths, flint, talc powder, cork, clays and the like and mixtures thereof with each other and with graphite and water glass or the like.

After applying the stop weld material to one or both of the confronting surfaces of the sheets 10 or 16, the sheets are positioned adjacent one another to form a blank 16 illustrated in FIGURE 3 with the layer of stop weld material 12 interposed therebetween. The sheets 10 and 16 are suitably secured together as by seam or tack welding to prevent relative shifting therebetween during subsequent handling and pressure rolling. The assembly is then subjected to conventional "Roll-Bond" treatment appropriate for the material selected for the component sheets; for example, with aluminum alloy 1100, the assembly is then placed in a furnace and heated to a temperature within the range of approximately 800° to 1000° F., preferably at a temperature of about 950° F. and thereafter, as illustrated in FIGURE 4, roll forged between a pair of pressure rolls 18 and 20 to a reduction of approximately 65% in order to produce a unified composite 22 from the blank 16. During the pressure rolling operation, the sheets are integrally unified over the peripheral marginal portion 15 to provide a firmly bonded peripheral edge seal 25, as seen in FIGURE 5. The sheets are either substantially unbonded or at best only partially bonded with a very weak or low grade adhesion over the area covered with the layer of stop weld material 12 and the small portion 14 where the stop weld material extends to an edge of the now unified composite blank.

The composite 22 is cooled and cold rolled to achieve the desired final gage and then annealed within the temperature range of about 650° to 800° F. for a minimum period of from 5 minutes to remove the hardening effect of the cold rolling. If sufficient accuracy in gage for the particular use of the panel can be obtained by hot rolling, the entire reduction can be carried out by hot rolling, and the cold rolling and annealing treatments may be omitted.

The sheets 10 and 16 are then mechanically pried apart in the unwelded area determined by the portion 14 of stop weld material which extends to an edge of the blank to permit the insertion therein of an appropriate nozzle 36 which is associated with an inflation fluid injecting apparatus, not shown. Insertion of the nozzle 36 permits injection of a pressure fluid into the unbonded or partially bonded panel blank after the blank is placed between hold down dies as hereinafter described.

The composite blank 22 is then positioned between a pair of templets or hold down dies 24 and 26 respectively, illustrated in FIGURE 6, which have formed on adjacent faces thereof cavities 28 and 30 which are patterned in accordance with the desired configuration of the internal cavity pattern of the finished panel. It is to be understood that while a sinuous conduit pattern has been illustrated in the dies of FIGURE 6, any desired pattern may be substituted therefor whether it be that of a continuous passageway, a grid or waffle type pattern, joined or intersecting passageways, or a plurality of uniform or non-uniform cavities disposed between the joined sheets of the composite blank. It is only essential that there be at least one edge terminus for each pattern which is not internally connected to any other pattern. In the illustrated embodiment of a sinuous conduit type passageway, each die pattern 28 and 30 is provided with corresponding terminal portions 32 and 34 which extend to an edge of the respective dies 24 and 26 and which are adapted to mate with the stop weld portion 14 so that this portion of the composite may be placed between the dies with the nozzle 36 previously inserted between the sheets 10 and 16.

After the composite 22 is positioned between the hold down dies 24 and 26, the dies are brought together until the die faces contact the outer faces of the composite 22, as seen in FIGURE 7, and a suitable fluid under pressure is injected into the partially joined or unjoined portion of the composite in order to cause expansion of the sheets 10 and 16 over those areas which lie adjacent the cavities 28 and 30 formed in the hold down dies. A pressure of approximately 250 to 300 p.s.i., depending upon the strength and composition of the component sheets and the degree of adhesion over the unbonded or partially bonded portions of the comopsite, is required to effect the desired expansion of the component sheets into the die cavities. The unrelieved portions of the hold down dies will effectively prevent separation of the remaining portions of the unbonded or partially bonded area of the composite.

It will be apparent that, when the expanded panel is removed from the hold down dies, there is achieved a unified composite article having internal hollow cavities 38 which dimensionally correspond with extreme accuracy to the configuration of the cavities formed in the die faces and which therefore correspond to predetermined requirements of cavity volume and pattern configuration, without the aforementioned disadvantages of prior art procedures.

It should be noted that, while the foregoing description is somewhat limited with respect to specific procedural and structural aspects of the invention, these limitations are not to be deemed as limiting the scope of the invention, and other modifications and forms of equivalent procedure or function are contemplated. Firstly, the inflation of the composite sheet 22 into the die cavities need not be symmetrical nor oppositely disposed as illustrated in FIGURE 6. For example, it is feasible to fabricate a sheet metal panel in which the hollow interior cavities are raised out of only one side of the panel, the other side remaining flat. Or, certain areas of the panel can be raised on one side while other areas can be raised on the opposite side. Still further, it is possible to have two distinctly different patterns on opposite sides of the panel.

As an alternative to the foregoing embodiment of this invention, wherein the degree of bond between the component sheets is primarily controlled by the selection of the stop weld material, it may be desirable in some situations to provide a stronger bond in the undeformed areas between the raised or bulged out portions of the finished panel which areas are defined by the unrelieved areas of the die surfaces. To this end, it is contemplated that the degree of bond is controlled by the amount of stop weld material which is present between the sheets during the pressure welding operation. The amount of stop weld material is controlled by first applying the material in the normal manner and then subjecting the coated sheet or sheets to a wire brushing operation to remove part of the stop weld material to a predetermined amount with extreme accuracy. Thus, the thinner the layer of stop weld material present between the sheets during pressure welding, the stronger will be the bond achieved after pressure rolling and accordingly the higher will be the inflation pressure necessary to effect expansion of the sheets into the cavities formed in the die faces. A panel formed by this process is advantageous in those situations where low pressure fluids are intended to flow through a conduit formed within the panel, such as for heat exchange purposes, where the pressure range is not of sufficient magnitude as to require an absolute bond between the component sheets, which would necessitate application of the stop weld material in a definite pattern thereby falling back into some or all of the aforementioned disadvantages of the prior art.

As an additional refinement to this latter embodiment, it is contemplated that certain small areas within the pattern area may be bonded by eliminating corresponding small areas of stop weld material. One important advantage of this modification is that with panels intended for architectural purposes, structural strength is increased to accommodate high external stress loadings.

It will be apparent from the foregoing description that there has been provided a method for making an expanded sheet metal article which is believed to provide a solution to the foregoing problems and achieve the aforementioned objects. It is to be understood that the invention is not limited to the embodiments described herein which are deemed to be merely illustrative of the best modes of carrying out the invention, but rather is intended to encompass all such modifications as are within the spirit and scope of the invention as set forth in the appended claims.

What I claim and desire to secure by Letters Patent is:

1. A method of making a sheet metal panel having a pattern of interior hollow cavities defined between a pair of partially unified sheets comprising:
   (A) applying a continuous, substantially uninterrupted layer of stop weld material to an entire confronting face of at least one of said sheets except for a marginal edge portion extending substantially around the periphery of said confronting face, said layer being of such thickness as to allow relatively low quality bonding of said sheets,
   (B) forming a blank by positioning said sheets adjacent one another with said layer of stop weld material interposed therebetween,
   (C) hot rolling said blank to simultaneously integrally unify said sheets over said marginal edge portion and to unify said sheets with a low quality bond over the portion thereof coated with said stop weld material, and
   (D) inflating said unified blank in the area of said low quality bond by injecting thereinto a fluid under pressure between a pair of hold down dies having cavities formed therein corresponding to the pattern of internal cavities desired in said panel whereby said sheets expand into said die cavities and remain unified in those areas where said dies are not relieved.

2. A method of making a sheet metal panel having a pattern of interior hollow cavities defined between a pair of partially unified sheets comprising:
   (A) applying a continuous, substantially uninterrupted layer of stop weld material to an entire confronting face of at least one of said sheets except for a marginal edge portion extending substantially around the periphery of said confronting face and being interrupted by a narrow strip of said stop weld material extending to an edge of said sheet, said layer being of such thickness as to allow relatively low quality bonding of said sheets,
   (B) forming a blank by positioning said sheets adjacent one another with said layer of stop weld material interposed therebetween,
   (C) hot rolling said blank to simultaneously integrally unify said sheets over said marginal edge portion and to unify said sheets with a low quality bond over the portion thereof coated with said stop weld material,
   (D) inserting a fluid injection nozzle into said unified blank in the area of said narrow strip,
   (E) positioning said unified blank between opposing faces of a pair of hold down dies having cavities formed therein corresponding to the pattern of internal cavities desired in said panel, and
   (F) inflating said unified blank in the area of said low quality bond by injecting thereinto a fluid under pressure while restraining said dies against separating movement whereby said sheets expand into said die cavities and remain unified in those areas where said dies are not relieved.

3. A process as set forth in claim 2 further including the step of removing a portion of the thickness of said layer of stop weld material prior to forming said blank.

References Cited

UNITED STATES PATENTS

| | | | |
|---|---|---|---|
| 2,941,280 | 6/1960 | Heuer et al. | 29—157.3 |
| 3,271,846 | 9/1966 | Buechele et al. | 29—157.3 |

FOREIGN PATENTS

| | | |
|---|---|---|
| 1,225,146 | 2/1960 | France. |
| 1,225,156 | 2/1960 | France. |
| 1,110,120 | 7/1961 | Germany. |
| 877,141 | 9/1961 | Great Britain. |

CHARLIE T. MOON, *Primary Examiner.*

JOHN F. CAMPBELL, *Examiner.*

J. D. HOBART, *Assistant Examiner.*